United States Patent [19]

Jahnke et al.

[11] Patent Number: 5,512,079
[45] Date of Patent: Apr. 30, 1996

[54] WATER-IN-OIL EMULSIFIERS FOR SLOW RELEASE FERTILIZERS USING TERTIARY ALKANOL AMINES

[75] Inventors: Richard W. Jahnke; John W. Forsberg, both of Mentor; Nils O. Pearson, Lyndhurst, all of Ohio

[73] Assignee: The Lubrizol Corporation, Wickliffe, Ohio

[21] Appl. No.: 337,800

[22] Filed: Nov. 14, 1994

[51] Int. Cl.$^6$ .................................................. C05G 5/00
[52] U.S. Cl. ........................................ 71/64.08; 71/64.11
[58] Field of Search ........................... 71/64.08, 64.11

[56] References Cited

U.S. PATENT DOCUMENTS

| | | | |
|---|---|---|---|
| 3,255,108 | 6/1966 | Wiese | 252/32.7 |
| 3,269,946 | 8/1966 | Wiese | 252/32.5 |
| 4,216,114 | 8/1980 | Baker | 252/341 |
| 4,234,435 | 11/1980 | Meinhardt et al. | 252/51.5 A |
| 4,445,576 | 5/1984 | Drake et al. | 166/291 |
| 4,708,753 | 11/1987 | Forsberg | 149/2 |
| 4,818,309 | 4/1989 | Yabsley | 149/2 |
| 4,828,633 | 5/1989 | Forsberg | 149/2 |
| 4,844,756 | 7/1989 | Forsberg | 149/2 |
| 4,919,178 | 4/1990 | Riga et al. | 149/2 |
| 4,919,179 | 4/1990 | Chattopadhyay | 149/2 |
| 4,940,497 | 7/1990 | Van Ommeren | 149/2 |
| 4,997,642 | 3/1991 | Curtis et al. | 71/64.08 |
| 5,047,175 | 9/1991 | Forsberg | 252/356 |
| 5,423,897 | 6/1995 | Hudson et al. | 71/64.11 |
| 5,445,663 | 8/1995 | Carlsen et al. | 71/64.08 |
| 5,451,243 | 9/1995 | Ahlnas | 71/64.11 |
| 5,478,375 | 12/1995 | Hudson | 71/64.11 |
| 5,482,529 | 1/1996 | Ahlnas et al. | 71/64.08 |

FOREIGN PATENT DOCUMENTS

| | | | |
|---|---|---|---|
| 2007348 | 7/1991 | Canada | C06B 45/00 |
| 102827A2 | 3/1984 | European Pat. Off. | E21B 33/138 |
| 557568A1 | 9/1993 | European Pat. Off. | C05C 9/00 |
| 561600A2 | 9/1993 | European Pat. Off. | C06B 47/14 |
| WO9316968 | 9/1993 | WIPO | C05G 5/00 |

OTHER PUBLICATIONS

WO93/01150 published Jan. 21, 1993 (Ahlnas).

*Primary Examiner*—Wayne Langel
*Attorney, Agent, or Firm*—John H. Engelmann; Frederick D. Hunter, Sr.; David N. Shold

[57] ABSTRACT

A non-explosive water in oil emulsion fertilizer composition is provided which comprises:

a discontinuous aqueous phase comprising at least one fertilizer component;

a continuous oil phase;

an emulsifier comprising the reaction product of at least one hydrocarbyl substituted succinic anhydride acylating agent and at least one tertiary alkanol amine.

18 Claims, No Drawings

WATER-IN-OIL EMULSIFIERS FOR SLOW RELEASE FERTILIZERS USING TERTIARY ALKANOL AMINES

TECHNICAL FIELD OF THE INVENTION

This invention relates to water-in-oil emulsions and more particularly to water-in-oil emulsion fertilizers containing succinate emulsifiers and water-soluble fertilizer components in the discontinuous water phase.

BACKGROUND OF THE INVENTION

It is an object of the invention to produce fertilizer compositions which provide controlled release of the fertilizer components. Water-in-oil emulsions for a variety of uses are known.

Water-in-oil emulsions have also been used for emulsion explosives. Water-in-oil explosive emulsions typically comprise a continuous organic phase and a discontinuous oxidizer phase containing water and an oxygen-supplying source such as ammonium nitrate, the oxidizer phase being dispersed throughout the continuous organic phase. Examples of such water-in-oil explosive emulsions are disclosed, inter alia, in U.S. Pat. Nos. 5,047,175; and 4,828,633. The emulsifier is a salt derived from high molecular weight carboxylic acylating agent coupled to a low molecular weight carboxylic acylating agent. Succinic acids and anhydrides are the preferred acylating agents.

U.S. Pat. No. 4,919,178 discloses water in oil emulsion explosives in which the emulsifier is the reaction product of two components, The first component is the reaction product certain carboxylic acids or anhydrides, including substituted succinic acids and anhydrides with ammonia or an amine and an alkali metal or an alkaline earth metal. The second component is the salt of a phosphorous containing acid.

European Patent application EP 561,600 A discloses a water-in-oil emulsion explosive in which the emulsifier is the reaction product of a substituted succinic acylating agent, having at least 1.3 succinic groups per equivalent weight of substituents, with ammonia and/or an amine. The substituent is a polyalkene having an number average molecular weight of greater than 500 and preferably 1300–1500.

Canadian Patent 2,007,348 discloses a water-in-oil emulsion explosive composition containing an expanded perlite as a void former. The invention is operative with explosive emulsions formed using a wide variety of emulsifiers including derivatives of polyisobutenyl succinic anhydride.

U.S. Pat. No. 4,940,497 discloses a water-in-oil emulsion explosive composition containing an expanded perlite as a void former. The invention is operative with explosive emulsions formed using a wide variety of emulsifiers including salts of polyisobutenyl succinic anhydride.

U.S. Pat. No. 4,919,179 discloses a water-in-oil emulsion explosive wherein the emulsifier is a particular type of ester of polyisobutenyl succinic anhydride.

U.S. Pat. No. 4,844,756 discloses a water-in-oil emulsion explosive wherein the emulsifier is a salt produced by reacting a hydrocarbyl substituted carboxylic acid or anhydride, including substituted succinic acids and anhydrides, with ammonia, an amine, and/or an alkali or alkaline earth metal.

U.S. Pat. No. 4,818,309 discloses a water-in-oil emulsion explosive wherein the emulsifier is a polyalkenyl succinic acid or derivative thereof. The succinic acid may be used in the form of an anhydride, an ester, an amide or an imide. A condensate with ethanolamine is preferred.

U.S. Pat. No. 4,708,753 discloses a water-in-oil emulsion suitable for use in explosive and functional fluids wherein the emulsifier is a reaction product of a hydrocarbyl substituted carboxylic acid, including a succinic acid, with an amine. The substituent contains 20–500 carbon atoms, and the aqueous phase contains a water soluble, oil insoluble functional additive.

European Patent EP 102,827 A discloses a water-in-oil emulsion composition useful as a well control fluid. The emulsifier is a polyamine derivative, especially an alkylene polyamine derivative, of a polyisobutenyl succinic anhydride or a borated or carboxylated derivative thereof.

U.S. Pat. No. 4,445,576 discloses a water-in-oil emulsion composition useful as a spacer fluid in well drilling. The emulsifier is an amine derivative, especially a polyamine derivative, of a polyalkenyl succinic anhydride.

U.S. Pat. No. 4,216,114 discloses the demulsification of water-in-oil emulsions using a polyester derivative prepared by reacting a 9–18 carbon alkyl or alkenyl substituted succinic anhydride with a polyalkylene glycol, and a polyhydric alcohol containing greater than 3 hydroxyl groups.

U.S. Pat. No. 3,269,946 discloses water-in-oil emulsions useful as lubricants or hydraulic fluids. The emulsifier is a substituted succinamide.

U.S. Pat. No. 3,255,108 discloses water-in-oil emulsions useful as lubricants or hydraulic fluids. The emulsifier is a substituted succinic ester.

United States defensive publication T969,003 discloses water-in-oil emulsion fertilizers. These materials are prepared by dissolving an invert emulsifier in an oil such as kerosene. The amount of surfactant used can vary over a wide range. The desired release rates are obtained when the surfactant makes up between 0.6 and 1% of the fertilizer formulation. A liquid fertilizer (a water solution) is emulsified with the oil to form an invert emulsion containing 80–90% liquid fertilizer, 10–20% oil and 0.6–1% surfactant. Ammonium phosphate, ammonium polyphosphate, ammonium nitrate, potassium chloride, urea solutions and mixtures thereof may be used as liquid fertilizers.

Patent Application WO93/16968 discloses a method of transport and storage of fertilizer compositions. The nutrient component of the fertilizer composition is in the form of the discontinuous water phase of a water-in-oil emulsion. The volume phase ratio of the discontinuous water phase to the total volume is in the range of 0.85–0.95. The nutrient component may include urea, ammonium nitrate or calcium ammonium nitrate. The emulsifier is added to the oil phase prior to stirring together the aqueous phase and the oil phase.

British Patent Application 0557568A1 discloses fertilizer compositions comprising dispersions or solution of nutrient components and the method for its manufacture. The solution/dispersion constitutes the discontinuous phase of a water-in-oil emulsion having a volume phase ratio of the discontinuous phase to the total volume in the range of 0.80–0.95. The oil or hydrocarbon component of the water-in-oil emulsion comprises mineral vegetable or animal oils, wax or a mixture of these, and the emulsion comprises at least one water-in-oil emulsifier. The oil phase may include an elastomer. The emulsifier disclosed in the examples is Sorbitan Monooleate (Span 80 from ICI).

SUMMARY OE THE INVENTION

A non-explosive water in oil emulsion fertilizer composition is provide which comprises:

a discontinuous aqueous phase comprising at least one fertilizer component; a continuous oil phase; and an emulsifier comprising the ester salt reaction product of at least ones hydrocarbyl substituted succinic anhydride acylating agent and at least one tertiary alkanol amine.

DETAILED DESCRIPTION OF THE INVENTION

The fertilizer compositions of the present invention are designed to provide controlled release of the fertilizer components. By varying the composition of the emulsifier, the rate of release of the fertilizer components from the emulsion to the environment may be varied. The compositions are intended for lawn, garden, and agricultural use. It has been found that the emulsifiers of the present invention provide emulsions with much slower release rates than those obtained using emulsifiers disclosed in the prior art.

When standard non-delayed release fertilizer compositions are applied in the ordinary manner, the nutrients they contain are released very quickly. If the nutrients are not absorbed immediately, either by the soil or by the growing plants, they may run off the land into the ground water. This run off is a problem because the plants which were to be fertilized can no longer obtain the components which have run off, and the run off can cause pollution of the ground water. Fertilizers which release their nutrient components over a period of time, and thereby provide for better utilization of the fertilizer applied, as well as reduced pollution of ground water are desirable. Generally speaking, the more oil and emulsifier in an emulsion fertilizer composition, the slower the release of fertilizer components which is observed. However, oil and emulsifiers are not fertilizer components, in that they do not provide nutrition to plants. In addition, oil may itself be environmentally undesirable. Accordingly, it is desired to obtain sustained release with as low levels of oil and emulsifier as possible.

Surprisingly, it has been found that the emulsifiers of the present invention provide emulsions with much slower release rates than those obtained using emulsifiers disclosed in the prior art. More particularly, In addition, it has been found that the emulsifiers of the present invention allow the rate of release to be controlled by adjusting the structure of the emulsifier.

The present invention provides for a composition in which a hydrocarbyl substituted succinic anhydride acylating agent is reacted with a tertiary alkanol amine to form an ester salt product which acts as an emulsifier. The reaction is conducted under conditions such that condensation reactions are unlikely to occur. Under these non-condensing reaction conditions, the product of the reaction between a hydrocarbyl substituted succinic anhydride acylating and a tertiary alkanol amine is an ester salt. More than one hydrocarbyl substituted succinic anhydride acylating agent and more than one tertiary alkanol amine may be used in the preparation of the emulsifier. The hydrocarbyl substituted succinic anhydride acylating agent or agents contain at least one hydrocarbyl substituent having an average of from about 10 to about 500 carbon atoms.

In the first step of the reaction between a hydrocarbyl substituted succinic anhydride acylating agent and tertiary alkanol amine the hydroxyl group reacts with the hydrocarbyl substituted succinic acylating agent to open the anhydride ring, and form a succinate ester. The product of the initial reaction contains an ester group, and a carboxyl group. Depending on the ratio of the reactants, the remaining carboxyl group can form either an internal salt, or an external salt. An internal salt is formed when the amino group from the alkanol amine, which formed the ester, reacts with the remaining carboxyl group of the hydrocarbyl substituted succinic acylating agent. An external salt is formed when amino group from an alkanol amine which is not attached to the acylating agent reacts with the remaining carboxyl group of the hydrocarbyl substituted succinic acylating agent. In either case, the product of the reaction is an ester salt, that is, a hydrocarbyl substituted succinic derivative wherein one of the carboxylic acid groups exists in the form of an ester, and at least some of the second carboxyl groups have been further reacted to form a salt. In order to obtain the ester salt as a product, it is important that the reaction be run under non-condensing conditions so that water is not eliminated from the derivatives of the hydrocarbyl substituted succinic acylating agent. Generally non-condensing conditions require that the reaction be run at a temperature less than about 120° C.

The term "emulsion" as used in this specification and in the appended claims is intended to cover not only water-in-oil emulsions, but also compositions derived from such emulsions wherein, at temperatures below that at which the emulsion is formed, the continuous phase is solid or the discontinuous is solid or in the form of droplets of supercooled liquid. This term also covers compositions derived from or formulated as such water-in-oil emulsions that are in the form of gelatinous or semi-gelatinous compositions.

The term "hydrocarbyl" is used herein to include:

(1) hydrocarbyl groups, that is, aliphatic (e.g., alkyl or alkenyl), alicyclic (e.g., cycloalkyl, cycloalkenyl), aromatic, aliphatic- and alicyclic- substituted aromatic groups and the like as well as cyclic groups wherein the ring is completed through another portion of the molecule (that is, any two indicated groups may together form an alicyclic group);

(2) substituted hydrocarbyl groups, that is, those groups containing non-hydrocarbon groups which, in the context of this invention, do not alter the predominantly hydrocarbyl nature of the hydrocarbyl group; those skilled in the art will be aware of such groups, examples of which include ether, oxo, halo (e.g., chloro and fluoro), alkoxyl, mercapto, alkylmercapto, nitro, nitroso, sulfoxy, etc.;

(3) hetero groups, that is, groups which, while having predominantly hydrocarbyl character within the context of this invention, contain other than carbon in a ring or chain otherwise composed of carbon atoms. Suitable heteroatoms will be apparent to those of skill in the art and include, for example, sulfur, oxygen, nitrogen and such substituents as pyridyl, furanyl, thiophenyl, imidazolyl, etc.

In general, no more than about three nonhydrocarbon groups or heteroatoms and preferably no more than one, will be present for each ten carbon atoms in a hydrocarbyl group. Typically, there will be no such groups or heteroatoms in a hydrocarbyl group and it will, therefore, be purely hydrocarbyl.

The hydrocarbyl groups are preferably free from acetylenic unsaturation; ethylenic unsaturation, when present will generally be such that there is no more than one ethylenic linkage present for every ten carbon- to-carbon bonds. The hydrocarbyl groups are often completely saturated and therefore contain no ethylenic unsaturation.

The term "lower" as used herein in conjunction with terms such as alkyl, alkenyl, alkoxy, and the like, is intended to describe such groups which contain a total of up to 7 carbon atoms.

Hydrocarbyl substituted succinic anhydride acylating agent:

The hydrocarbyl substituted succinic anhydride acylating agents may be represented by the formula:

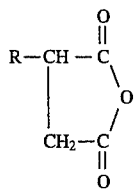

wherein R is a $C_{10}$ to about a $C_{500}$ hydrocarbyl group. Preferably, R is an aliphatic or alicyclic hydrocarbyl group with less than about 10% of its carbon-to-carbon bonds being unsaturated. R can be derived from olefins of from 10 to about 18 carbon atoms with alpha-olefins being particularly useful. Examples of such olefins include 1-decene, 1-undecene, 1-dodecene, 1-tridecene, 1-tetradecene, 1-pentadecene, 1-hexadecene, 1-heptadecene, 1-octadecene, etc. Commercially available alpha olefin fractions such as $C_{15-18}$ alpha-olefins, $C_{12-16}$ alphaolefins, $C_{14-16}$ alpha-olefins, $C_{14-18}$ alpha-olefins, $C_{16-18}$ alphaolefins, etc., are particularly useful; these commercial alpha-olefin fractions also usually include minor amounts of alpha-olefins outside the given ranges. The R group may also be derived from olefinic compounds containing up to about 500 carbon atoms. Smaller olefins may be oligomerized, or polymerized to form a suitable R group. Preferably the R group contains at least about 10 carbon atoms, preferably about 60 carbon atoms to about 180 carbon atoms, and may contain polar substituents, oil-solubilizing pendant groups, and be unsaturated within the general limitations explained hereinabove. The production of such hydrocarbyl substituted succinic acids and their derivatives is well known to those of skill in the art and need not be discussed in detail herein. Generally, these processes involve the reaction of (1) an ethylenically unsaturated carboxylic acid, acid halide, anhydride or ester reactant, such as maleic anhydride, with (2) an ethylenically unsaturated hydrocarbon (a chlorine free process) or a chlorinated hydrocarbon (a chlorine process) at a temperature within the range of about 100°–300° C., preferably, about 100° C. to about 200° C. The product from this reaction is a hydrocarbyl-substituted succinic anhydride wherein the substituent is derived from the olefin or chlorinated hydrocarbon. The present invention works equally well with the products produced by a chlorine process or a chlorine free process. The reaction product of the halide or olefin with unsaturated acid may be hydrogenated to remove all or a portion of any ethylenically unsaturated covalent linkages by standard hydrogenation procedures, if desired.

The ethylenically unsaturated hydrocarbon reactant and the chlorinated hydrocarbon reactant used in the preparation of these hydrocarbyl substituted succinic anhydride acylating agents are preferably substantially saturated petroleum fractions and substantially saturated olefin polymers and the corresponding chlorinated products. Polymers and chlorinated polymers derived from mono-olefins having from 2 to about 30 carbon atoms are preferred. Especially useful polymers are the polymers of 1-mono-olefins such as ethylene, propene, 1-butene, isobutene, 2-methyl-1-butene, 3-methyl-1-butene, 1-pentene, 1-hexene, 1-heptene, 1-octene, 1-nonene, 2-methyl- 1-heptene, 3-cyclohexyl-1-butene, and 2-methyl-5-propyl-1-hexene. Polymers of medial olefins, i.e., olefins in which the olefinic linkage is not at the terminal position, likewise are useful. These are exemplified by 2-butene, 3-pentene, and 4-octene.

Interpolymers of 1-mono-olefins such as illustrated above with each other and with other interpolymerizable olefinic substances such as aromatic olefins, cyclic olefins, and polyolefins, are also useful sources of the ethylenically unsaturated reactant. Such interpolymers include for example, those prepared by polymerizing isobutene with styrene, isobutene with butadiene, propene with isoprene, propene with isobutene, ethylene with piperylene, isobutene with chloroprene, isobutene with p-methyl-styrene, 1-hexene with 1,3-hexadiene, 1-octene with 1-hexene, 1-heptene with 1-pentene, 3-methyl- 1-butene with 1-octene, 3,3-dimethyl-1-pentene with 1-hexene, isobutene with styrene and piperylene, etc.

For reasons of hydrocarbon solubility, the interpolymers contemplated for use in preparing the acylating agents of this invention are preferably substantially aliphatic and substantially saturated, that is, they should contain at least about 80% and preferably about 95%, on a weight basis, of units derived from aliphatic mono-olefins. Preferably, they will contain no more than about 5% olefinic linkages based on the total number of the carbon-to-carbon covalent linkages present.

In one embodiment of the invention, the polymers and chlorinated polymers are obtained by the polymerization of a $C_4$ refinery stream having a butene content of about 35% to about 75% by weight and an isobutene content of about 30% to about 60% by weight in the presence of a Lewis acid catalyst such as aluminum chloride or boron trifluoride. These polyisobutenes preferably contain predominantly (that is, greater than about 80% of the total repeat units) isobutene repeat units of the formula:

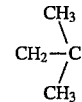

The chlorinated hydrocarbons and ethylenically unsaturated hydrocarbons used in the preparation of the carboxylic acylating agents preferably have up to about 500 carbon atoms per molecule. The polymeric materials which may be used to prepare the hydrocarbyl substituted succinic acylating agents may be characterized, as above, by the average number of carbon atoms which they contain. Polymeric materials are not uniform, and contain a variety of molecules of different chain lengths. Such polymers have also been characterized by their Mn (number average molecular weight). The average number of carbons correlates with the Mn of the polymer. For example, if a polymer containing an average of 100 carbon atoms is reacted with maleic anhydride, the hydrocarbyl substituted succinic anhydride produced has an Mn of approximately 1500. Similarly, for a polymer containing an average of 500 carbon atoms, the hydrocarbyl substituted succinic anhydride produced would have an Mn of approximately 7100. Such polymers have also been characterized by their Mw (weight average molecular weight). Because the chain lengths of a polymeric material are not always evenly distributed, the Mw and Mn are not always identical. The polymeric materials useful in preparing the hydrocarbyl substituted succinic acylating agents have Mw/Mn ratios from about 1.5 to about 4.5. Materials with ratios of about 1.5 to about 3.6 or 3.2 are useful. Materials with ratios of about 1.8, or about 2, to about 2.5, about 3.2, or about 3.6 are useful. Gel permeation chromatography may be used to determine the values of Mw and Mn as well as the Mw/Mn ratio. A useful method is disclosed in U.S. Pat. No. 4,234,435.

If an excess of maleic anhydride is reacted with the polymeric material to form the hydrocarbyl substituted succinic acylating agent, more than one succinic group may add to an individual polymer chain. The amount of such poly-substitution may be expressed in terms of the number of succinic groups for each equivalent weight of substituent group (derived from the polymeric material).

The equivalent weight of the polyalkene is its Mn. The equivalents of substituent groups in the hydrocarbyl substituted succinic acylating agent is determined by dividing the total weight of substituents by the Mn of the poly alkene. The number of succinic groups per equivalent weight of substituents present in the hydrocarbyl substituted succinic acylating agent may be found by comparing the equivalents of succinic groups in the molecule to the equivalents of substituents. This subject is disclosed in U.S. Pat. No. 4,234,435 which is hereby incorporated by reference for its disclosure of methods determining the number of succinic groups per equivalent of substituents and for its disclosure of methods of measuring the values of Mw and Mn.

The hydrocarbyl substituted succinic acylating agents useful in the present invention have from about 1.0 to about 4.5 succinic groups for each equivalent weight of substituent group. The preferred number of succinic groups for each equivalent weight of substituent group is from about 1.0 to about 2.5 and the more preferred range is from about 1.0 to 2.0.

The polyalkylene may be any of those described above. In one embodiment, the polyalkylene has an average of about 10 to 500 carbon atoms. In a preferred embodiment, the polyalkene has from about 10 to about 150 carbon atoms.

In another embodiment, the hydrocarbyl group contains an average from about 10, or about 12 up to about 40, or to about 30, or to about 24, or to about 20 carbon atoms. In one embodiment, the hydrocarbyl group contains an average from about 16 to about 18 carbon atoms.

The hydrocarbyl substituted succinic anhydride acylating agents are prepared by reacting the above-described olefins, isomerized olefins or oligomers thereof with unsaturated maleic anhydride at a temperature of about 160°, or about 185° C. up to about 240° C., or to about 210° C. The procedures for preparing the acylating agents are well known to those skilled in the art and have been described for example in U.S. Pat. No. 3,412,111; and Ben et al, "The Ene Reaction of Maleic Anhydride With Alkenes", J.C.S. Perkin II (1977), pages 535–537. These references are incorporated by reference for their disclosure of procedures for making the above acylating agents. In one embodiment, the alkenyl group is derived from oligomers of lower olefins, i.e., olefins containing from 2 to about 6, or about 4 carbon atoms.

(3) Hydroxyamines (A)(II):

The terms "hydroxyamine", "alkanol amine", and "aminoalcohol" describe the same class of compounds and, therefore, can be used interchangeably. The tertiary alkanol amines useful in the present invention are represented by the formula."

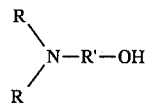

wherein each R is independently a hydrocarbyl group of one to about eight carbon atoms or hydroxyl-substituted hydrocarbyl group of one to about eight carbon atoms and R' is a divalent hydrocarbyl group of about two to about 18 carbon atoms. The group -R'-OH in such formula represents the hydroxyl-substituted hydrocarbyl group. R' can be an acyclic, alicyclic or aromatic group. Typically, R' is an acyclic straight or branched divalent group such as an ethyl, propyl, butyl, octadecyl, etc. group. Where two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each R is a lower alkyl group of up to seven carbon atoms. The hydroxyamines can also be an ether N-(hydroxy-substituted hydrocarbyl)amine. These are hydroxyl-substituted poly(hydrocarbyloxy) analogs of the above-described hydroxy amines (these analogs also include hydroxyl-substituted oxyalkylene analogs). Such N-(hydroxyl-substituted hydrocarbyl) amines can be conveniently prepared by reaction of epoxides with afore-described amines and can be represented by the formula:

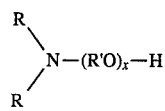

wherein x is a number from about 2 to about 15 and each R is independently a hydrocarbyl group of one to about eight carbon atoms or hydroxyl-substituted hydrocarbyl group of one to about eight carbon atoms and R' is a divalent hydrocarbyl group of about two to about 18 carbon atoms.

Formation of the Emulsifier Compositions:

The emulsifier compositions of the invention can be prepared by reacting, under non-condensing conditions, one or more hydrocarbyl substituted succinic anhydride acylating agents with one or more tertiary alkanol amines to form the desired emulsifier. In order to obtain the ester salt as the predominant product, it is important that the reaction be run under non-condensing conditions so that water is not eliminated from the derivatives of the hydrocarbyl substituted succinic acylating agent. Generally non-condensing conditions require that the reaction be run at a temperature less than about 120° C. Temperatures higher than 120° C. will tend to promote condensation at the expense of the desired ester salt product. While some condensation is not detrimental, temperatures higher than 120° C. for long periods of time will lead to excessive condensation. Accordingly the reaction should be run at temperatures below 200° C., and in such a manner that temperatures above 120° C. are not maintained for an excessive period of time. Spectroscopic methods of analysis are well known to those skilled in the art, and the course of the reaction may readily be determined. Accordingly, those skilled in the art will have little difficulty in selecting reaction conditions which produce the desired ester salt.

The ratio of reactants utilized in the preparation of the inventive emulsifier compositions may be varied over a wide range. Generally, for each equivalent of each of the acylating agents from about 0.1 to about 2 equivalents or more of tertiary alkanol amine are used.

The number of equivalents of the acylating agents depends on the total number of carboxylic functions present. In determining the number of equivalents for the acylating agent, those carboxyl functions which are not capable of reacting as a carboxylic acid acylating agent are excluded. In general, however, there is one equivalent of acylating agent for each carboxy group in these acylating agents. For example, there would be two equivalents in an anhydride derived from the reaction of one mole of olefin polymer with one mole of maleic anhydride. Conventional techniques are readily available for determining the number of carboxyl functions (e.g., acid number, saponification number) and, thus, the number of equivalents of each of the acylating agents can be readily determined by one skilled in the art.

For reactions which involve the amine, an equivalent weight of a tertiary alkanol amine is the molecular weight of the tertiary alkanol amine divided by the total number of nitrogens present in the molecule. Thus, if dimethylethanolamine, is used as tertiary alkanol amine component, it would have an equivalent weight equal to its molecular weight. For reactions which involve the hydroxide group, the equivalent weight of a tertiary alkanol amine is the molecular weight of the tertiary alkanol amine divided by the total number of hydroxides present in the molecule. Thus, triethanolamine provides one equivalent of amine and three equivalents of hydroxide per gram molecular weight. The equivalent weight of triethanolamine is equal to the molecular weight for the purpose of the reactions involving the amine and one third the molecular weight for reactions involving the hydroxide function.

For mineral oil emulsions, it has been found that the rate of release of the fertilizer components from the emulsion composition may be controlled by the ratio of the hydroxy amine to the acylating agent. The rate of release of the fertilizer components into an aqueous medium is correlated with the amount of alkanol amine used to form the emulsifier. The effect becomes important as the amount of tertiary alkanol amine is increased beyond one half equivalent of alkanol amine (based on the amine) for each equivalent of the hydrocarbyl substituted succinic anhydride acylating agent. Thus, emulsions prepared using emulsifiers formed with greater than one half equivalent (nitrogen) of alkanol amine per equivalent of acylating agent, release fertilizer components faster than emulsions prepared using emulsifiers formed with one half equivalent (nitrogen) or less of alkanol amine per equivalent of acylating agent. It is important to remember that each nitrogen is one equivalent while a succinic group is di-equivalent. Accordingly, one half equivalent of amine per equivalent of the hydrocarbyl substituted succinic acylating agent corresponds to one amine for each succinic group. By varying the composition of the emulsifier, the rate of release of the emulsion fertilizer can be matched to needs of the particular application for the fertilizer. The results with vegetable oil emulsions are more variable and less predictable.

The following examples illustrate the preparation of the compositions of this invention. Unless otherwise indicated, in the following examples and elsewhere in the specification and claims, all parts and percentages are by weight, and all temperatures are in degrees centigrade.

EXAMPLE A

A mixture of 4916 g. (9.46 equivalents) of a hydrocarbyl substituted succinic anhydride (avg. MW=1039), and 2640 g. of a 40 SUS neutral oil (Sun 40N) was stirred and heated to a temperature of 70°–80° C. Over a period of 2 minutes, 420 g. (4.73 equivalents of nitrogen) of dimethylethanolamine were added dropwise with stirring. No heat was applied during the addition of the dimethylethanolamine. An exotherm was observed during addition, and the temperature rose from 72° C. to 81° C. The was heated for 2.5 hours with stirring at a temperature of 85°–95° C. After stirring, 24 g. of tap water was added and the mixture was held 1 hour at a temperature of 90°–95° C.

EXAMPLE B

A mixture of 155.7 g. (0.30 equivalents) of a hydrocarbyl substituted succinic anhydride (avg. MW=1038), 88.1 g. Pale 40 neutral oil, and 0.8 g. tap $H_2$) were stirred for 1 hour at a temperature of 85–90° C. Triethanolamine, 22.4 g. (0.15 equivalents based upon nitrogen) was added over 15 minutes with stirring. No heat was applied during the addition. An exotherm was observed. The temperature rose from 85°–87° C. The mixture was heated and stirred for 4 hours at a temperature of 85°–90° C.

EXAMPLE C

A mixture of 270 g. (0.52 equivalents) of a hydrocarbyl substituted succinic anhydride (avg. MW=1038), and 347.5 g. of a Pale 40 neutral oil was heated, with stirring, to a temperature of 85° C. Triethanolamine, 77.5 g. (0.52 equivalents based upon nitrogen) was added over 42 minutes with stirring. No heat was applied during the addition. An exotherm was observed. The temperature rose from 85°–86° C. and then dropped to 71° C. at the end of addition. The mixture was heated and stirred to 115° C. and held for 4 hours at a temperature of 115°–120° C.

EXAMPLE D

A mixture of 809 g. (1.56 equivalents) of a hydrocarbyl substituted succinic anhydride (avg. MW=1038), and 347.5 g. of a Pale 40 neutral oil was heated, with stirring, to a temperature of 65° C. Diethylethanolamine, 91.2 g. (0.779 equivalents based upon nitrogen), was added over 0.5 hours. An exotherm was observed. The temperature rose from 65°–66° C. and then dropped to 64° C. at the end of addition. The mixture was heated and stirred for 2 hours at a temperature of 85°–95° C. The mixture was cooled to 65° C. and 3.6 g. of $H_2O$ was added.

EXAMPLE E

A mixture of 220 g. (0.394 equivalents) of a hydrocarbyl substituted succinic anhydride (avg. MW=1117), and 133 g. of a Pale 40 neutral oil was heated, with stirring, to a temperature of 108° C. Diethylethanolamine, 46.0 g. (0.393 equivalents based upon nitrogen), was added over 3 minutes. A slight exotherm was observed. The mixture was heated and stirred for 40 minutes at a temperature of 120°–125° C. The mixture was cooled to 80° C. and 1.2 g. of $H_2O$ was added and blended.

Fertilizer Compositions:

The fertilizer compositions of the invention are water-in-oil emulsions using the salts described above as emulsifiers. They have different fertilizer component release properties depending on the ratio of the hydrocarbyl substituted succinic acylating agent to the alkanol amine. In other words, emulsions prepared using emulsifiers formed with greater than one half equivalent (nitrogen) of alkanol amine per equivalent of acylating agent release fertilizer components faster than emulsions prepared using emulsifiers formed with one half equivalent (nitrogen) of alkanol amine per equivalent of acylating agent. The inventive fertilizer compositions comprise a discontinuous aqueous fertilizer phase comprising at least one water soluble fertilizer component, a continuous organic phase comprising at least one oil, and an emulsifying amount of at least one of the salt compositions of the invention. The fertilizer compositions of the present invention share some characteristics with explosive emulsions. For example, both are water-in-oil emulsions, and both may include ammonium nitrate as a component. However, the fertilizer emulsions are different from the explosive emulsions in that the ability to detonate is a necessary feature of the emulsion explosives and is an undesirable characteristic of an emulsion fertilizer. There are several methods which may be used to assure that emulsion fertilizer is non-explosive. It is important to avoid materials which may act as sensitizers in emulsion explosives. These explosive sensitizers include glass or resin microspheres or other gas containing particles, self explosive materials such as TNT, DNT, RDX and the like and various organic nitrates. Emulsion explosives may contain particulate oxygen supplying salts such as potassium perchlorate. Extra quantities of oxygen supply salts are to be avoided in fertilizer compositions. Ammonium nitrate is commonly used in emulsion explosives. It also a valuable fertilizer ingredient. Urea may be used to replace some of the ammonium nitrate. Such replacement result in an emulsion which is less explosive. The inclusion of other fertilizer components which are not oxidizing salts, such as phosphates tend to make the emulsions less explosive. By use of the one or combinations of the methods discussed above, the fertilizer compositions of the present invention may be rendered non-explosive.

The water soluble fertilizer components include the major fertilizer components which supply nitrogen, potassium and phosphorous. Optionally, various components to supply specialized nutrients may be included. Thus, if a particular soil is deficient in a trace element a water soluble form of this element could be included in the discontinuous phase. Examples of such trace elements include boron, iron, manganese, sulfur, zinc, copper and molybdenum. These materials may be used in the form of their salts, or in other suitable form. If the salts are soluble, they may be incorporated in the aqueous phase, and if insoluble, they may be suspended in the emulsion. Among the major components, nitrogen may be supplied by organic material such as urea, guanidine, and their salts, as well as by inorganic materials such o as ammonium nitrate, alkali metal nitrates, and alkaline earth nitrates. Potassium may be supplied by potassium salts such as carbonate, chloride, nitrate, phosphates, pyrophosphate, and sulfate. Phosphorous may be supplied by alkali and alkaline earth metal phosphate salts.

The continuous organic phase, that is oil phase, that is useful in the fertilizer emulsions of the invention can include oils from a variety of sources, including natural and synthetic oils and mixtures thereof. Hydrocarbon oils, for example, paraffinic, olefinic, naphthenic, aromatic, saturated or unsaturated hydrocarbons, may be used. In general, the oil is water-immiscible, emulsifiable and is either liquid at about 20° C. or becomes a liquid at a temperature of up to about 95° C., and preferably up to about 60° C.

Natural oils include animal oils and vegetable oils (e.g., castor oil, lard oil) as well as solvent-refined or acid-refined mineral oils of the paraffinic, naphthenic, or mixed paraffin-naphthenic types. Oils derived from coal or shale are also useful. Synthetic oils include hydrocarbon oils such as polymerized and interpolymerized olefins (e.g., polybutylenes, polypropylenes, propylene-isobutylene copolymers, chlorinated polybutylenes, etc.); alkyl benzenes (e.g., dodecylbenzenes, tetradecylbenzenes, dinonylbenzenes, di-(2-ethylhexyl) benzenes, etc.); polyphenyls (e.g., biphenyls, terphenyls, alkylated polyphenyls, etc.); and the like.

Another suitable class of synthetic oils that can be used comprises the esters of dicarboxylic acids (e.g., phthalic acid, succinic acid, alkyl succinic acid, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, pentaerythritol, etc.). Specific examples of these esters include dibutyl is adipate, di(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like.

Esters useful as synthetic oils also include those made by reacting $C_5$ to $C_{24}$ monocarboxylic acids mono alcohols or polyols. The mono alcohols include $C_1$ to $C_{18}$ aliphatic alcohols. Polyols include neopentyl glycol, trimethylol propane, pentaerythritol, dipentaerythritol, tripentaerythritol, and polyol ethers.

Unrefined, refined and rerefined oils and mixtures of thereof can be used. Unrefined oils are those obtained directly from a natural or synthetic source without further purification treatment. For example, a shale oil obtained directly from a retorting operation, a petroleum oil obtained directly from distillation or ester oil obtained directly from an esterification process and used without further treatment would be an unrefined oil. Refined oils are similar to the unrefined oils except that they have been further treated in one or more purification steps to improve one or more properties. Many such purification techniques are known to those of skill in the art such as solvent extraction, distillation, acid or base extraction, filtration, percolation, etc. Rerefined oils may be used as the oil phase. Such rerefined oils are also known as reclaimed or reprocessed oils and often are obtained by processes similar to those used to obtain ordinary refined oils. These rerefined oils may be additionally processed by techniques directed toward removal of spent additives and oil breakdown products.

Examples of useful oils include a white mineral oil available from Witco Chemical Company under the trade designation KAYDOL; a white mineral oil available from Shell under the trade designation ONDINA; and a mineral oil available from Pennzoil under the trade designation N-750-HT.

The biodegradability of the oil phase is important in fertilizer compositions. Thus the more biodegradable mineral oils are favored over the heavier less biodegradable oils. Vegetable oils are favored because of their biodegradability and because of their ready availability. Usable vegetable oils include babbasu, palm, castor, olive, peanut, rapeseed, corn, sesame, coconut, cottonseed, soybean, linseed, sunflower, and safflower. It has been found that vegetable oils in general form emulsions which release the fertilizer components more quickly than emulsions prepared from mineral oils. Accordingly, the type of oil employed in preparing the emulsion may also be used to control the rate of release of the fertilizer components. Pure vegetable oil, or mixtures of vegetable oil and mineral oils may be used to obtain the desired rate of release.

The continuous organic phase is preferably present at a level of at least about 2% by weight, more preferably in the range of from about 2% to about 10% by weight, more preferably in the range of from about 3.5% to about 8% by weight based on the total weight of fertilizer emulsion. The discontinuous fertilizer phase is preferably present at a level of at least about 90% by weight, more preferably at a level in the range of from about 90% to about 98% by weight, more preferably from about 92% to about 96.5% by weight based on the total weight of said fertilizer emulsion.

The emulsifier salt compositions of the invention are preferably present at a level in the range of from about 4% to about 40% by weight, more preferably from about 12% to about 20% by weight based on the total weight of the organic phase. The fertilizer component or components are preferably present at a level in the range of from about 70% to about 95% by weight, more preferably from about 85% to about 92% by weight, more preferably from about 87% to about 90% by weight based on the total weight of the aqueous phase. The water is preferably present at a level in the range of about 5% to about 30% by weight, more preferably about 8% to about 15% by weight, more preferably about 10% to about 13% by weight based on the weight of the aqueous phase.

The fertilizer emulsions may be prepared by dissolving the emulsifier in the oil phase, and adding the aqueous phase with stirring. The aqueous phase is prepared by dissolving the fertilizer components in water. Only moderate shear mixing is required. Both stirred and static mixers are useable in preparing the emulsions.

The fertilizer compositions may include solid fertilizer components suspended in the emulsion. The suspended components may include any of the water soluble fertilizer components noted above. Since these components are suspended in the emulsion, but are less protected by the continuous oil phase, they will be released rather quickly. By this means, a fertilizer may be prepared which provides for early release of some components, and delayed release of the rest. For example, a fertilizer could be prepared which releases some nitrogen early and delays the rest. Such a fertilizer could provide a fertilizer dosage in one application which would require two applications of conventional fertilizer. In addition, soil conditioning components, which are insoluble in water could be suspended in the fertilizer emulsion. For example powdered limestone or sulfur could be suspended in the fertilizer emulsion. The limestone and sulfur would serve to shift the pH balance of the soil.

EXAMPLE 1

Fertilizer compositions were prepared by dissolving the emulsifier in the oil phase. The emulsifier made up 20% of the oil phase. Emulsifier compositions containing neutral oil were incorporated in such a manner that the actual emulsifier level was 20% of the oil phase. Any neutral oil contained in the emulsifier composition was considered to be part of the oil phase, and replaced added oil. The oil and the emulsifier were blended at approximately 90° C. The aqueous phase was prepared by heating 150 g. of water, 400 g. ammonium nitrate, and 400 g. of urea to 82°–85° C. A 50 gram sample of the oil phase at a temperature of 90° C. was placed in a 1.5 quart plastic container. The hot aqueous phase was added, with stirring, at a temperature of 82°–85° C., to the oil phase. The addition was conducted slowly so that the aqueous phase added was assimilated before further aqueous phase was added. Generally, addition required three to seven minutes. During the addition, the mixture was stirred using a Mixmaster® mixer. During the addition, the mixer was run at 50 volts. After addition was complete, the emulsification process was completed by stirring for two minutes using the Mixmaster® mixer at 120 volts.

EXAMPLE 2

The release characteristics of the fertilizer samples prepared in EXAMPLE 1 were tested. There is no generally accepted method for testing the release characteristics of emulsion fertilizers. However, the following procedure has been developed to provide a method for the uniform testing of fertilizer emulsions. The emulsion is prepared and a 1.7 gram sample is taken and placed, as one lump, in a stoppered 250 ml. Erlenmeyer flask. 100 milliliters of water are added to the flask and the mixture is maintained at 30° C. The flask is shaken—on a Lab-Line® Orbit Environ orbital shaker at 200 RPM. Samples of the aqueous phase are withdrawn on a regular basis and analyzed by conductivity for the fertilizer component contained in the emulsion. After analysis, the aqueous sample is returned to the flask and shaking continued. A graph of the amount of the fertilizer component released versus time is prepared. The time when 10%, 20% etc. of the fertilizer component is released is estimated from the graph.

EXAMPLE A-1

The emulsifier of EXAMPLE A was formed into a fertilizer emulsion using the procedure of EXAMPLE 1. The oil was Kaydol® refined white mineral oil. The rate of release of the fertilizer components was tested according to EXAMPLE 2.

| KAYDOL & THE EMULSIFIER OF EXAMPLE A | |
|---|---|
| % RELEASED | DAYS OF EXPOSURE |
| 10 | 7 |
| 20 | 16 |
| 30 | 22 |
| 40 | 27 |
| 50 | 31 |
| 60 | 35 |
| 70 | 40 |
| 80 | 43 |
| 90 | 46 |
| 100 | 48 |

EXAMPLE B-1

The emulsifier of EXAMPLE B was formed into a fertilizer emulsion using the procedure of EXAMPLE 1. The oil was Kaydol® refined white mineral oil. The rate of release of the fertilizer components was tested according to EXAMPLE 2.

| KAYDOL & THE EMULSIFIER OF EXAMPLE B | |
|---|---|
| % RELEASED | DAYS OF EXPOSURE |
| 5 | 7 |
| 10 | 8 |
| 20 | 10 |
| 30 | 14 |
| 40 | 26 |
| 50 | 29 |
| 60 | 34 |
| 70 | 38 |
| 80 | 44 |
| 90 | 53 |
| 100 | 58 |

EXAMPLE B-2

The emulsifier of Example B was formed into a fertilizer emulsion using the procedure of EXAMPLE 1. The oil was a high oleic acid content sunflower oil, Trisun® 80. The rate of release of the fertilizer components was tested according to EXAMPLE 2.

RELEASE RATE
SUNFLOWER OIL & THE EMULSIFIER OF EXAMPLE B

| % RELEASED | DAYS OF EXPOSURE |
| --- | --- |
| 10 | 1 |
| 20 | 2 |
| 30 | 3 |
| 40 | 4 |
| 50 | 5 |
| 60 | 7 |
| 70 | 8 |
| 80 | 10 |
| 90 | 14 |
| 100 | 18 |

EXAMPLE C-1

The emulsifier of EXAMPLE C was formed into a fertilizer emulsion using the procedure of EXAMPLE 1, The oil was KAYDOL® refined white mineral oil. The rate of release of the fertilizer components was tested according to EXAMPLE 2.

RELEASE RATE
KAYDOL & THE EMULSIFIER OF EXAMPLE C

| % RELEASED | DAYS OF EXPOSURE |
| --- | --- |
| 5 | 4 |
| 10 | 8 |
| 20 | 11 |
| 30 | 14 |
| 40 | 16 |
| 50 | 19 |
| 60 | 22 |
| 70 | 26 |
| 80 | 30 |
| 90 | 35 |
| 100 | 39 |

EXAMPLE C-2

The emulsifier of EXAMPLE C was formed into a fertilizer emulsion using the procedure of EXAMPLE 1. The oil was a high oleic acid content sunflower oil, Trisun® 80. The rate of release of the fertilizer components was tested according to EXAMPLE 2.

RELEASE RATE
SUNFLOWER OIL & THE EMULSIFIER OF EXAMPLE C

| % RELEASED | DAYS OF EXPOSURE |
| --- | --- |
| 10 | 0.5 |
| 20 | 1 |
| 30 | 2 |
| 40 | 2.6 |
| 50 | 3 |
| 60 | 4 |
| 70 | 5 |
| 80 | 6 |
| 90 | 7 |
| 100 | 9 |

EXAMPLE D-1

The emulsifier of EXAMPLE D was formed into a fertilizer emulsion using the procedure of EXAMPLE 1. The oil was KAYDOL® refined white mineral oil. The rate of release of the fertilizer components was tested according to EXAMPLE 2.

RELEASE RATE
KAYDOL & THE EMULSIFIER OF EXAMPLE D

| % RELEASED | DAYS OF EXPOSURE |
| --- | --- |
| 10 | 11 |
| 20 | 16 |
| 30 | 20 |
| 40 | 24 |
| 50 | 27 |
| 60 | 31 |
| 70 | 35 |
| 80 | 40 |
| 90 | 45 |
| 100 | 49 |

EXAMPLE E-1

The emulsifier of Example E was formed into a fertilizer emulsion using the procedure of EXAMPLE 1. The oil was KAYDOL® refined white mineral oil. The rate of release of the fertilizer components was tested according to EXAMPLE 2.

RELEASE RATE
KAYDOL & THE EMULSIFIER OF EXAMPLE E

| % RELEASED | DAYS OF EXPOSURE |
| --- | --- |
| 10 | 8 |
| 20 | 15 |
| 30 | 18 |
| 40 | 21 |
| 50 | 24 |
| 60 | 27 |
| 70 | 30 |
| 80 | 32 |
| 90 | 37 |
| 100 | 42 |

EXAMPLE E-2

The emulsifier of EXAMPLE E was formed into a fertilizer emulsion using the procedure of EXAMPLE 1. The oil was Trisun® 80 high oleic acid sunflower oil. The rate of release of the fertilizer components was tested according to EXAMPLE 2.

RELEASE RATE
SUNFLOWER OIL & THE EMULSIFIER OF EXAMPLE E

| | DAYS OF EXPOSURE | |
| --- | --- | --- |
| % RELEASED | SAMPLE 1 | SAMPLE 2 |
| 10 | 1 | 1 |
| 20 | 2 | 2 |
| 30 | 3.5 | 3.5 |
| 40 | 4 | 4 |
| 50 | 5 | 5 |
| 60 | 5 | 6 |
| 70 | 6 | 7 |
| 80 | 8 | 10 |
| 90 | 12 | 14 |
| 100 | 17 | 17 |

COMPARATIVE EXAMPLES

The following comparative examples illustrate the performance of the prior art emulsifiers used in emulsion fertilizer compositions.

COMPARATIVE EXAMPLE 1

A fertilizer emulsion composition was prepared using KAYDOL oil and a sorbitan mono-oleate emulsifier. The weights of ingredients and the procedure for forming the emulsion corresponded to EXAMPLE 1. The rate of release of the fertilizer components was tested according to EXAMPLE 2.

| RELEASE RATE | |
|---|---|
| % RELEASED | DAYS OF EXPOSURE |
| 20 | 0.5 |
| 50 | 1 |
| 90 | 2 |
| 100 | 3 |

COMPARATIVE EXAMPLE 2

A fertilizer emulsion composition was prepared using KAYDOL oil and WITCAMIDE-511, a dimeric condensation product of oleic acid and ethanolamine, as an emulsifier. The weights of ingredients and the procedure for forming the emulsion corresponded to Example 1. The rate of release of the fertilizer components was tested according to EXAMPLE 2.

| RELEASE RATE | |
|---|---|
| % RELEASED | DAYS OF EXPOSURE |
| 20 | 0.6 |
| 40 | 1 |
| 60 | 2 |
| 80 | 2.5 |
| 100 | 4 |

COMPARATIVE EXAMPLE 3

A fertilizer emulsion composition was prepared using KAYDOL oil and WITCONOL-14, a dimeric condensation product of oleic acid and glycerol, as an emulsifier. The weights of ingredients and the procedure for forming the emulsion corresponded to Example 1. The rate of release of the fertilizer components was tested according to EXAMPLE 2.

| RELEASE RATE | |
|---|---|
| % RELEASED | DAYS OF EXPOSURE |
| 20 | 1 |
| 40 | 2 |
| 60 | 3 |
| 70 | — |
| 80 | 4 |
| 90 | — |
| 100 | 5 |

COMPARATIVE EXAMPLE 4

An attempt was made to prepare a fertilizer emulsion composition was using sunflower oil and a sorbitan mono-oleate emulsifier. The weights of ingredients and the procedure for forming the emulsion corresponded to Example 1. An emulsion did not form.

COMPARATIVE EXAMPLE 5

An attempt was made to prepare a fertilize emulsion composition using sunflower oil and WITCAMIDE-511, a dimeric condensation product of oleic acid and ethanolamine, as an emulsifier. The weights of ingredients and the procedure for forming the emulsion corresponded to Example 1. An emulsion did not form.

COMPARATIVE EXAMPLE 6

A fertilizer emulsion composition was prepared using sunflower oil and WITCONOL-14, a dimeric condensation product of oleic acid and glycerol, as an emulsifier. The weights of ingredients and the procedure for forming the emulsion corresponded to Example 1. The rate of release was tested according to example II. The emulsion released 100% of the fertilizer components within two days.

We claim:

1. A non-explosive water-in-oil emulsion fertilizer composition comprising:

a discontinuous aqueous phase comprising at least one fertilizer component;

a continuous oil phase;

an emulsifier comprising the ester salt reaction product of at least one hydrocarbyl substituted succinic anhydride acylating agent and at least one tertiary alkanol amine.

2. A fertilizer emulsion according to claim 1 wherein the hydrocarbyl substituted succinic acylating agent is represented by the formula

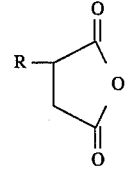

wherein R is derived from a $C_2$ to $C_{18}$ olefin.

3. A fertilizer emulsion according to claim 1 wherein the hydrocarbyl substituted succinic acylating agent is represented by the formula

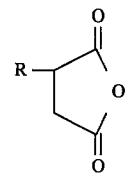

wherein R is derived from a polymerized olefin; said polymerized olefin containing between 30 and 500 carbon atoms.

4. A fertilizer emulsion according to claim 1 wherein the hydrocarbyl substituted succinic acylating agent is represented by the formula

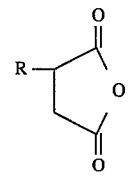

wherein R is derived from a polyisobutylene having a number average molecular weight (Mn) of 400 to 4000.

5. A fertilizer emulsion according to claim 1 wherein the hydrocarbyl substituted succinic acylating agent is represented by the formula

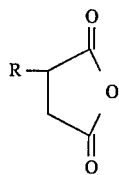

wherein R is derived from a polyisobutylene having a number average molecular weight (Mn) of 400 to 4000 and the tertiary alkanol amine is selected from the group consisting of: dimethylethanolamine, diethylethanolamine and triethanolamine.

6. A fertilizer emulsion according to claim 1 wherein the tertiary alkanol amine is represented by the formula:

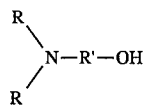

wherein each R is independently a hydrocarbyl group of 1 to 8 carbon atoms and R' is a divalent hydrocarbyl group of 2 to 18 carbon atoms.

7. A fertilizer emulsion according to claim 1 wherein the tertiary alkanol amine is represented by the formula:

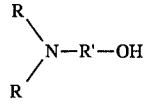

wherein each R is independently a hydroxyl-substituted hydrocarbyl group of 1 to 8 carbon atoms and R' is a divalent hydrocarbyl group of 2 to 18 carbon atoms.

8. A fertilizer emulsion according to claim 1 wherein the tertiary alkanol amine is represented by the formula:

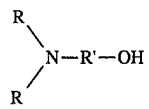

wherein each R is independently a hydrocarbyl group of 1 to 8 carbon atoms and R' is a divalent hydrocarbyl group selected from the groups consisting of ethyl, propyl and butyl.

9. A fertilizer emulsion according to claim 1 wherein the tertiary alkanol amine is selected from the group consisting of: dimethylethanolamine, diethylethanolamine and triethanolamine.

10. A method of fertilizing plants comprising applying a fertilizer emulsion according to claim 1 to the soil in which the plants are planted.

11. A method of fertilizing plants comprising applying a fertilizer emulsion according to claim 2 to the soil in which the plants are planted.

12. A method of fertilizing plants comprising applying a fertilizer emulsion according to claim 3 to the soil in which the plants are planted.

13. A method of fertilizing plants comprising applying a fertilizer emulsion according to claim 5 to the soil in which the plants are planted.

14. A method of fertilizing plants comprising applying a fertilizer emulsion according to claim 6 to the soil in which the plants are planted.

15. A method of fertilizing plants comprising applying a fertilizer emulsion according to claim 7 to the soil in which the plants are planted.

16. A method of fertilizing plants comprising applying a fertilizer emulsion according to claim 9 to the soil in which the plants are planted.

17. A fertilizer emulsion according to claim I wherein the continuous phase is a mineral oil.

18. A fertilizer emulsion according to claim I wherein the continuous phase is a vegetable oil.

* * * * *